April 21, 1953     M. GARLAND     2,635,238
APPARATUS FOR CLAMPING UMBILICAL CORDS AND THE LIKE
Filed July 11, 1949
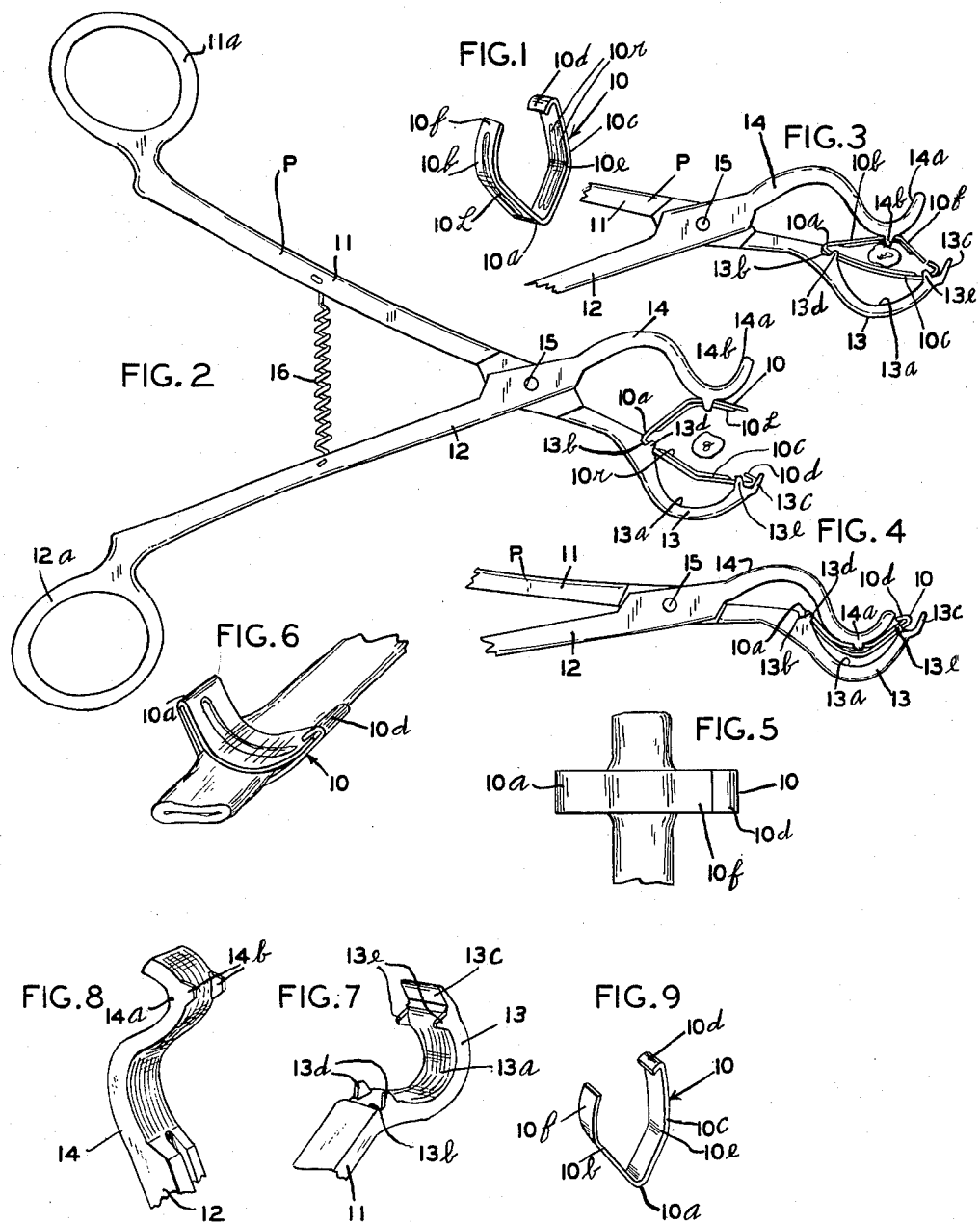
INVENTOR
MATHER GARLAND
BY
Williamson & Williamson
ATTORNEYS Patented Apr. 21, 1953

2,635,238

UNITED STATES PATENT OFFICE 2,635,238

APPARATUS FOR CLAMPING UMBILICAL CORDS AND THE LIKE

Mather Garland, Mound, Minn.

Application July 11, 1949, Serial No. 104,014

4 Claims. (Cl. 1—49.1)

This invention relates to apparatus including a highly efficient clamp for sealing and clamping an umbilical cord or analogous tubular vessel or conduit.

Various umbilical clips and funis clamps have been patented and in some instances, put into restricted use but all of these devices, to my knowledge, have been objectionable for one reason or the other. In some instances, umbilical clamps heretofore used have been unsafe for the reason that the jaw members of the clamping structure were not permanently secured in operative relation. In many instances, the clip or clamp could not be applied until after cutting of the cord and then only with difficulty while in other instances, the clamp could not be depended upon to thoroughly clamp and seal the cord and retain the same in sealed relation.

It is an object of my invention to provide apparatus comprising a highly efficient metal clamp cooperatively related with a special pliers to enable the clamp to be positively applied and locked from an open position, receiving the uncut cord and bent and formed to give double strength and a greater area for efficiently clamping flexible tubular members such as cords of various sizes.

Another object is the provision of an improved, metallic clamp in combination with an ingenious and specially conceived pliers for forming and locking said clamp upon a flexible tubular element or shank whereby a substantially permanent locking is effected with complete sealing of the clamped tubular member such as an umbilical cord.

These and other objects and advantages of my invention will more fully appear from the following description made in connection with the accompanying drawings wherein like reference characters refer to similar parts throughout the several views and in which:

Fig. 1 is a perspective view of an embodiment of my improved clamp in open position, ready for application to a cord or shank;

Fig. 2 is a side elevation showing my special clamp operating, forming and locking pliers in initial clamp retaining position with one of my clamps positioned therein for application;

Fig. 3 is a similar view with the handle portions of the pliers broken away showing the position of the jaws of the pliers and the legs of the clamp during the first stages of the clamp-applying operation;

Fig. 4 is a similar view showing the positioning of the jaws of the pliers and the formation of the clamp and sealing of the flexible cord in the last stage of operation of the pliers;

Fig. 5 is a top plan view of the clamp applied to a portion of the umbilical cord;

Fig. 6 is a perspective view of the clamp operatively applied to a section of cord;

Fig. 7 is a perspective view of the operating face of the lower jaw of the pliers detached; and Fig. 8 is a perspective view of the operating face of the upper jaw of the pliers detached; and Fig. 9 is a perspective view of a somewhat simplified embodiment of my clamp.

As shown in the drawings (see particularly Figs. 1 and 2) my clamp or umbilical clip is preferably integrally formed from a strip of non-corrosive, somewhat flexible metal such as thin aluminum or aluminum alloy which is capable of being forcibly bent and retaining its shape when bent and which preferably is somewhat malleable. The clamp indicated as an entirety by the numeral 10, is before operation thereof, in the general form of a letter V having an apex 10a medially of its length and having a pair of legs 10b and 10c diverging therefrom. The longer leg 10c at its extremity is inturned to form a normally open locking flange 10d related to the adjacent portion of the leg in the manner of a small inverted V. Longer leg 10c as shown, is bent along a line 10e at its intermediate portion although this is not an essential factor for correct operation of the device.

The shorter leg 10b terminates in preferably a straight end 10f adapted during application and forming of my clamp through the cooperation of a pair of special pliers P to be projected beneath the locking flange 10d of the longer leg and thereafter positively locked and clinched under said flange. Leg 10b also is preferably bent at an intermediate portion closer to its extremity than in the case of the longer leg to present an obtuse angle although this bending is not essential to the shape functioning or operation of my apparatus.

In the form of clamps shown in Fig. 1, the longer leg 10c is provided with a pair of longitudinally extending, parallel ribs 10r protruding from the inner surface thereof and extending from points adjacent the apex 10a to points short of the bent extremity 10d. These ribs may be conveniently formed by a die in corrugated manner and serve to reinforce the leg 10c as well as to provide between the ribs, a seating channel to receive a longitudinal rib 10L formed centrally in the leg 10b and protruding from the inner side thereof.

In the simpler form of my clamp shown in Fig. 9, the legs are not ribbed or reinforced.

To apply, lock and form my clamp 10, I have perfected and provided a special tool, preferably in the form of a pair of pliers P having a pair of crossed shanks 11 and 12 pivoted adjacent their outer ends upon a pivot screw 15 and having a thumb and finger handle respectively 11a and 12a fixed to the extremities thereof. Shank 11 has integrally formed therewith, a jaw 13 having a curved outer portion and provided with a substantially arcuate, concave clamping surface 13a near the outer extremity thereof and having a notch or shoulder 13b disposed just inwardly of the concave portion for seating and receiving the apex 10a of one of the clamps. The jaw 13 at its outer extremity is provided with an abutment finger 13c angled in relation to the adjacent portion of the jaw to form (as shown in Figs. 2 and 3) a seat to initially abut and retain the outer extremity of the leg 10c of one of my clamps. Jaw 13 is also preferably, but not necessarily provided with a pair of spaced retaining ears 13d disposed just forwardly or outwardly of the apex retaining seat 13b and a second pair of strip-retaining ears 13e disposed just rearwardly of the shoulder and abutment extremity 13c.

The shank 12 of the pliers has integrally formed or otherwise rigidly secured therewith, a reversely curved jaw indicated as an entirety by the number 14 and having at its outer portion, a convex clamping section 14a opposed to the clamping jaw portion 13 and complementally shaped to the concave opposed jaw portion 13a. Jaw 14 is also preferably provided with a pair of spaced strip-retaining ears 14b positioned medially of the curved jaw surface and protruding from the sides thereof to assist in retaining the straight end portion 10f of the clamp leg 10b.

I prefer to provide means such as a coil spring 16 for urging the shanks and consequently, jaws 13 and 14 together with light pressure adequate to retain the clamp 10 in its open position.

In use, one of my clamps is readily applied to the pliers P with the jaws 13 and 14 of the pliers in open position, as shown in Fig. 2, the apex 10a of the clamp being seated in the apex notch 13b of jaw 13 and the ends of the legs 10b and 10c of the clamp being respectively engaged by the convex clamping surface 14a of jaw 14 and the abutment finger 13c of jaw 13 of the pliers. The clamp is held in the open position for application shown in Fig. 2 with the light tension placed on the jaws by spring 16 retaining the clamp from falling out. The retaining shoulders 13b, 13d and 13e and 14b serve to more securely retain the clamp or clip 10 although they may be dispensed with and satisfactory results obtained.

The clamp in the pliers P may then be moved to partially surround an umbilical cord U or other tubular or shank like member.

In surrounding position, as shown in Fig. 2, the jaws of the pliers are forced together by manipulation of the handles 11a and 12a of the shanks, causing in the first closing movement of the jaws, the end 10b of the shorter leg to be moved towards the longer leg 10c, its extremity slipping past the hook like clinching flange 10d of the longer leg to the position shown in Fig. 3. Further closing movement of jaws 13 and 14 bends and forms the shorter leg 10b of the clamp first to substantially a straight position with the extremity 10f longitudinally moving outwardly beneath the clinching flange 10d. Thereafter, in closing movement of the plier jaws starts the curving or bowing of the two leg members 10b and 10c shortening the over-all length of the doubled clamp member and bringing the hook flange 10d into position beneath the outer portion of the convex jaw clamping surface 14a. At this time, the extremity of the longer leg 10c has become disengaged by the abutment finger 13c and is interposed between the opposed extremities of the cooperating clamping surfaces 13a and 14a of the two jaws, as shown in Fig. 4.

The jaws 13 and 14 are moved together to the extreme limit of movement, clamping the legs tightly against the cord or shank U and forming the clamp into the arcuate, operative position shown in Figs. 4 to 6 inclusive for tightly sealing the cord or tube and for very positively affixing the clamp to the cord, tube or shank.

It is to be understood that all of the longitudinal edges of my clamp are nicely rounded to prevent any possible cutting of skin or cord at the area of stricture or in adjacent portions thereof.

When the form of clamp illustrated in Fig. 1 is used, the longitudinal rib 10L of the shorter leg 10b seats in the channel formed between the spaced, longitudinal ribs 10r of the longer leg 10c, producing even a more effective sealing action of a tubular cord when the clamp is applied than that obtained from the simpler form of clamp shown in Fig. 9. My clamp or clip 10 is of such simplicity and is so light that when used for clamping an umbilical cord, it may be retained by the baby until the cord sloughs off. It cannot produce any injury because of its structure and the rounded longitudinal edges of the legs 10b and 10c.

The inherent form of the clamp 10 and its formation and bending into arcuate shape by the carrying out of my method and the use of my forming and clinching jaws, results in a strong, rigid construction of double thickness with reinforcing through the arcuate bending. The curved structure of the clamp when operatively formed and applied, gives greater area on the contacting or clipping portions than if the structure were retained in straight line clamping position.

It will be further seen that ease and accuracy of application of my structure due to the combination of the novel structure of clip as well as the inventive tool for forming and clinching and clamping the structure, is an important factor. For medical or surgical uses, the clamp may be instantly applied before the umbilical cord is cut.

While my structure and method has particular applicability for surgical use on umbilical cords and other conduits of the human body, it is also well adapted for use as an attachment tag or identification for application to the legs of fowls or for application to rods or shank-like elements of mechanical structure or apparatus.

It will of course, be understood that various changes may be made in the form, details, arrangement and proportions of the parts without departing from the scope of my invention.

What I claim is:

1. In combination, a clamp-applying and forming tool and a clamp for closure of an attachment to an umbilical cord or other tubular or shank-like element, said clamp comprising a stiff, bendable metal strip originally formed to have a pair of spaced, opposing clamping legs and a medial interconnecting portion, said interconnecting portion having an element for retention in a seat provided by said tool, one of said legs having an inwardly bent locking flange at its extremity, the other of said legs being shorter and terminating in a substantially straight end adapted for insertion beneath said locking flange, said tool comprising a pair of opposing clamp-engaging jaws, one of said jaws being convexly curved to engage the extremity and thereafter, the medial portion of the shorter leg of said clamp, the other of said jaws being concavely curved in complement to said first jaw and opposed thereto, said second jaw having a seat for retaining said element of the medial interconnecting portion of said clamp and having a shoulder adjacent its extremity for engagement with the extremity of the longer leg of said clamp during initial operation of said tool and means for forcing said jaws together and apart.

2. In combination, a clamp-forming and applying pliers and a clamp for closing an umbilical cord or other flexible, tubular or shank-like element, said clamp comprising a generally V-shaped metal strip constructed of material which is bendable and will retain its shape when bent, said strip having an intermediate apex and a pair of clamping legs diverging therefrom before said clamp is applied, one of said legs having a locking hook at its extremity, the other of said legs being shorter and terminating in a substantially straight end adapted for insertion beneath said locking hook, said pliers comprising a pair of opposing clamp-engaging jaws, one of said jaws being convexly curved to engage the extremity and thereafter, the medial portion of the shorter leg of said clamp, the other of said jaws being concavely curved in complement to said first jaw and opposed thereto, said jaw having an apex-retaining groove disposed inwardly of said concave curve and having a shoulder adjacent its extremity for engagement with the extremity of said longer leg during initial operation of said pliers.

3. In combination, a clamp-applying and forming tool and a clamp for closure of and attachment to an umbilical cord or other tubular or shank like element, said clamp comprising a stiff, bendable metal strip adapted to retain itself in a bent or deformed position and originally formed to have a pair of spaced, opposing clamping legs and a medial interconnecting portion, said interconnecting portion having a bend for retention in a seat or shoulder provided by said tool, one of said legs having an inwardly bent extremity to constitute a locking flange, the other of said legs being shorter and terminating in a substantially straight end, adapted for insertion beneath said locking flange, said tool comprising a pair of opposing clamp-engaging jaws, one of said jaws being convexly curved to engage the extremity and thereafter the medial portion of the shorter leg of said clamp, the other of said jaws being concavely curved in complement to said first jaw and opposed thereto, said second jaw having a seat or shoulder for retaining said bend on the medial interconnecting portion of said clamp and having an element adjacent its extremity for engagement with the outer portion of the longer leg of said clamp during initial operation and means for forcing said jaws together and apart.

4. A clamp forming and applying pliers for operation upon a bendable, metal clamp strip having the general shape of a V and provided on one of the legs of said V with a terminal locking hook, said pliers comprising a pair of opposing clamp-engaging jaws, one of said jaws near the extremity thereof being convexly curved to engage and form the medial portion of one of the legs of the clamp, the other of said jaws being concavely curved in complement to said first jaw and opposed thereto, said second jaw having a shoulder for retaining the apex portion of the V-shaped clamp and having an element adjacent its extremity for engagement with the extremity and locking hook of the second leg of the clamp during initial operation and means for forcing said jaws together and apart.

MATHER GARLAND.

References Cited in the file of this patent

UNITED STATES PATENTS

| Number | Name | Date |
|---|---|---|
| 2,384,697 | Riccardi | Sept. 11, 1945 |
| 2,434,831 | Brandenburg | Jan. 20, 1948 |